(12) United States Patent
Ravimohan et al.

(10) Patent No.: US 10,114,562 B2
(45) Date of Patent: Oct. 30, 2018

(54) ADAPTIVE BLOCK ALLOCATION IN NONVOLATILE MEMORY

(71) Applicant: SANDISK TECHNOLOGIES LLC, Plano, TX (US)

(72) Inventors: Narendhiran Chinnaanangur Ravimohan, Karnataka (IN); Muralitharan Jayaraman, Karnataka (IN); Abhijeet Manohar, Karnataka (IN); Alan Bennett, Edinburgh (GB)

(73) Assignee: SanDisk Technologies LLC, Plano, TX (US)

(*) Notice: Subject to any disclaimer, the term of this patent is extended or adjusted under 35 U.S.C. 154(b) by 268 days.

(21) Appl. No.: 14/488,037

(22) Filed: Sep. 16, 2014

(65) Prior Publication Data

US 2016/0077749 A1 Mar. 17, 2016

(51) Int. Cl.
*G06F 3/06* (2006.01)
*G06F 12/0804* (2016.01)
*G06F 12/0866* (2016.01)
*G06F 12/02* (2006.01)

(52) U.S. Cl.
CPC ............ *G06F 3/0617* (2013.01); *G06F 3/064* (2013.01); *G06F 3/0688* (2013.01); *G06F 12/0246* (2013.01); *G06F 12/0804* (2013.01); *G06F 12/0866* (2013.01); *G06F 2212/7201* (2013.01); *G06F 2212/7204* (2013.01); *G06F 2212/7208* (2013.01); *G06F 2212/7211* (2013.01)

(58) Field of Classification Search
None
See application file for complete search history.

(56) References Cited

U.S. PATENT DOCUMENTS

| 5,043,940 A | 8/1991 | Harari |
| 5,070,032 A | 12/1991 | Yuan et al. |
| 5,095,344 A | 3/1992 | Harrari |
| 5,172,338 A | 12/1992 | Mehrotra et al. |
| 5,313,421 A | 5/1994 | Guterman et al. |
| 5,315,541 A | 5/1994 | Harari et al. |

(Continued)

FOREIGN PATENT DOCUMENTS

| EP | 0 887 732 | 12/1998 |
| EP | 0 977 121 A2 | 2/2000 |

(Continued)

OTHER PUBLICATIONS

Eitan et al., "NROM: A Novel Localized Trapping, 2-Bit Nonvolatile Memory Cell," IEE Electron Device Letters, vol. 21, No. 1, Nov. 2000, pp. 543-545.

(Continued)

*Primary Examiner* — Midys Rojas
*Assistant Examiner* — Marwan Ayash
(74) *Attorney, Agent, or Firm* — Foley & Lardner LLP

(57) ABSTRACT

In a multi-plane non-volatile memory, good blocks of different planes are linked for parallel operation for storing long host writes. Where bad blocks in one or more planes result in unlinked blocks, the unlinked blocks are configured for individual operation to store short host writes and/or memory system management data. Unlinked blocks may be configured as Single Level Cell (SLC) blocks while linked blocks may be configured as SLC blocks or Multi Level Cell (MLC) blocks.

20 Claims, 8 Drawing Sheets

(56) References Cited

U.S. PATENT DOCUMENTS

| | | | |
|---|---|---|---|
| 5,343,063 A | 8/1994 | Yuan et al. |
| 5,367,484 A | 11/1994 | Alexander et al. |
| 5,404,485 A | 4/1995 | Ban |
| 5,473,765 A | 12/1995 | Gibbons et al. |
| 5,532,962 A | 7/1996 | Auclair et al. |
| 5,570,315 A | 10/1996 | Tanaka et al. |
| 5,661,053 A | 8/1997 | Yuan |
| 5,742,934 A | 4/1998 | Shinohara et al. |
| 5,751,634 A | 5/1998 | Itoh |
| 5,768,192 A | 6/1998 | Eitan |
| 5,774,397 A | 6/1998 | Endoh et al. |
| 5,798,968 A | 8/1998 | Lee et al. |
| 5,860,124 A | 1/1999 | Matthews et al. |
| 5,890,192 A | 3/1999 | Lee et al. |
| 5,903,495 A | 5/1999 | Takeuchi et al. |
| 5,907,856 A | 5/1999 | Estakhri et al. |
| 5,909,449 A | 6/1999 | So et al. |
| 5,930,167 A | 7/1999 | Lee et al. |
| 5,937,425 A | 8/1999 | Ban |
| 6,011,725 A | 1/2000 | Eitan |
| 6,034,897 A | 3/2000 | Estakhri et al. |
| 6,046,935 A | 4/2000 | Takeuchi et al. |
| 6,125,435 A | 9/2000 | Estakhri et al. |
| 6,141,249 A | 10/2000 | Estakhri et al. |
| 6,222,762 B1 | 4/2001 | Guterman et al. |
| 6,226,728 B1 | 5/2001 | See et al. |
| 6,272,610 B1 | 8/2001 | Katayama et al. |
| 6,304,980 B1 | 10/2001 | Beardsley et al. |
| 6,377,500 B1 | 4/2002 | Fujimoto et al. |
| 6,401,160 B1 | 6/2002 | See et al. |
| 6,421,279 B1 | 7/2002 | Tobita et al. |
| 6,426,893 B1 | 7/2002 | Conley et al. |
| 6,456,528 B1 | 9/2002 | Chen |
| 6,490,649 B2 | 12/2002 | Sinclair |
| 6,522,580 B2 | 2/2003 | Chen et al. |
| 6,542,956 B1 | 4/2003 | Lee et al. |
| 6,563,734 B2 | 5/2003 | Taki |
| 6,567,307 B1 | 5/2003 | Estakhri |
| 6,571,261 B1 | 5/2003 | Wang-Knop et al. |
| 6,591,330 B2 | 7/2003 | Lasser |
| 6,643,170 B2 | 11/2003 | Huang et al. |
| 6,725,321 B1 | 4/2004 | Sinclair et al. |
| 6,763,424 B2 | 7/2004 | Conley |
| 6,871,259 B2 | 3/2005 | Hagiwara et al. |
| 6,895,464 B2 | 5/2005 | Chow et al. |
| 6,898,662 B2 | 5/2005 | Gorobets |
| 6,988,175 B2 | 1/2006 | Lasser |
| 7,032,065 B2 | 4/2006 | Gonzalez et al. |
| 7,315,916 B2 | 1/2008 | Bennett et al. |
| 2001/0042882 A1 | 11/2001 | Chang et al. |
| 2002/0099904 A1 | 7/2002 | Conley |
| 2003/0053334 A1 | 3/2003 | Chen |
| 2003/0065899 A1 | 4/2003 | Gorobets |
| 2003/0076709 A1 | 4/2003 | Huang et al. |
| 2003/0109093 A1 | 6/2003 | Harari et al. |
| 2003/0110343 A1 | 6/2003 | Hagiwara et al. |
| 2004/0030825 A1 | 2/2004 | Otake et al. |
| 2004/0103241 A1 | 5/2004 | Chang et al. |
| 2005/0141312 A1 | 6/2005 | Sinclair et al. |
| 2005/0141313 A1 | 6/2005 | Gorobets et al. |
| 2005/0144358 A1 | 6/2005 | Conley et al. |
| 2005/0144360 A1 | 6/2005 | Bennett et al. |
| 2005/0144363 A1 | 6/2005 | Sinclair |
| 2005/0144365 A1 | 6/2005 | Gorobets et al. |
| 2005/0144367 A1 | 6/2005 | Sinclair |
| 2005/0166087 A1 | 7/2005 | Gorobets |
| 2005/0286297 A1* | 12/2005 | Roohparvar ........ G11C 11/5628 365/185.03 |
| 2009/0240873 A1* | 9/2009 | Yu .......................... G06F 3/0608 711/103 |
| 2010/0169540 A1* | 7/2010 | Sinclair ............... G06F 12/0246 711/103 |
| 2011/0271043 A1* | 11/2011 | Segal .................. G06F 12/0246 711/103 |
| 2013/0024605 A1* | 1/2013 | Sharon ................ G06F 11/1072 711/103 |

FOREIGN PATENT DOCUMENTS

| | | |
|---|---|---|
| EP | 1424631 A | 6/2004 |
| JP | 5314019 | 11/1993 |
| WO | WO 00/049488 | 8/2000 |
| WO | WO 01/018640 | 3/2001 |
| WO | WO 02/058074 | 7/2002 |
| WO | WO 03/029951 | 9/2002 |
| WO | WO 03/027828 | 4/2003 |
| WO | WO 2004/040457 | 5/2004 |
| WO | WO 2004/040458 | 5/2004 |
| WO | WO 2004/040459 | 5/2004 |
| WO | WO 2004/040578 | 5/2004 |

OTHER PUBLICATIONS

Chang, Li-Pin et al., "An Adaptive Striping Architecture for Flash Memory Storage Systems of Embedded Systems", Proceedings of the Eighth IEEE Real-Time and Embedded Technology and Applications Symposium, Sep. 24, 2002, pp. 187-196.

Kim et al., "A Space-Efficient Flash Translation Layer for CompactFlash Systems," IEEE Transaction on Consumer Electronics, vol. 48, No. 2, May 2002, pp. 366-375.

* cited by examiner

ADAPTIVE BLOCK ALLOCATION IN NONVOLATILE MEMORY

BACKGROUND

This application relates to the operation of re-programmable nonvolatile memory systems such as semiconductor flash memory systems, and, more specifically, to operation of multiple planes in such systems.

Solid-state memory capable of nonvolatile storage of charge, particularly in the form of EEPROM and flash EEPROM packaged as a small form factor card, has recently become the storage of choice in a variety of mobile and handheld devices, notably information appliances and consumer electronics products. Unlike RAM (random access memory) that is also solid-state memory, flash memory is non-volatile, and retains its stored data even after power is turned off. Also, unlike ROM (read only memory), flash memory is rewritable similar to a disk storage device. Flash memory, both embedded and in the form of a removable card is ideally suited in the mobile and handheld environment because of its small size, low power consumption, high speed and high reliability features.

Flash EEPROM is similar to EEPROM (electrically erasable and programmable read-only memory) in that it is a non-volatile memory that can be erased and have new data written or "programmed" into their memory cells. Both utilize a floating (unconnected) conductive gate, in a field effect transistor structure, positioned over a channel region in a semiconductor substrate, between source and drain regions. A control gate is then provided over the floating gate. The threshold voltage characteristic of the transistor is controlled by the amount of charge that is retained on the floating gate. That is, for a given level of charge on the floating gate, there is a corresponding voltage (threshold) that is applied to the control gate before the transistor is turned "on" to permit conduction between its source and drain regions. In particular, flash memory such as Flash EEPROM allows entire blocks of memory cells to be erased at the same time.

Nonvolatile memory devices are also manufactured from memory cells with a dielectric layer for storing charge. Instead of the conductive floating gate elements described earlier, a dielectric layer is used. The charge for one data bit is localized in the dielectric layer adjacent to the drain, and the charge for the other data bit is localized in the dielectric layer adjacent to the source. Multi-state data storage is implemented by separately reading the binary states of the spatially separated charge storage regions within the dielectric.

Memory cells of a typical flash EEPROM array are divided into discrete blocks of cells that are erased together. That is, the erase block is the erase unit, a minimum number of cells that are simultaneously erasable. Each erase block typically stores one or more pages of data, the page being the minimum unit of programming and reading, although more than one page may be programmed or read in parallel in different sub-arrays or planes. Each page typically stores one or more sectors of data, the size of the sector being defined by the host system. An example sector includes 512 bytes of user data, following a standard established with magnetic disk drives, plus some number of bytes of overhead information about the user data and/or the erase block in which they are stored.

In order to increase the degree of parallelism during programming user data into the memory array and reading user data from it, the array is typically divided into sub-arrays, commonly referred to as planes, which contain their own data registers and other circuits to allow parallel operation such that sectors of data may be programmed to or read from each of several or all the planes simultaneously. An array on a single integrated circuit may be physically divided into planes, or each plane may be formed from a separate one or more integrated circuit chips.

To further efficiently manage the memory, erase blocks may be linked together to form virtual blocks or metablocks. That is, each metablock is defined to include one erase block from each plane.

SUMMARY

In a multi-plane non-volatile memory, good blocks of different planes are linked for parallel operation for storing long host writes with a high degree of parallelism. Where bad blocks in one or more planes result in unlinked blocks (odd blocks), the unlinked blocks are configured for individual operation to store short host writes and/or memory system management data. In some cases, unlinked blocks may be configured as Single Level Cell (SLC) blocks while linked blocks may be configured as Multi Level Cell (MLC) blocks or SLC blocks.

An example of a method of operating a multi-plane flash memory array includes: identifying bad blocks in a first plane of the multi-plane flash memory array and designating a first number of good blocks of the first plane for storage of user data; identifying bad blocks in a second plane of the multi-plane flash memory array and designating a second number of good blocks of the second plane for storage of user data, the second number being greater than the first number; linking the first number of good blocks of the first plane with good blocks of the second plane to form the first number of metablocks, each of the first number of metablocks configured for parallel operation across the first and second planes; identifying a third number of good blocks in the second plane that are not linked, the third number being equal to the second number minus the first number; and configuring the third number of good blocks in the second plane for individual operation to store selected data.

The selected data may include memory system management data that is stored by a memory controller. The memory system management data may include one or more of: boot code, file system data, logical-to-physical address mapping data, and bad block location data. The selected data may include short host writes of less than a threshold amount of data. The first number of metablocks may be configured for Multi Level Cell (MLC) operation and the third number of good blocks may be configured only for SLC operation. Subsequent to configuring the first number of metablocks, a determination may be made that an individual block of the first number of blocks of the first plane has become bad; the individual block may be designated as a bad block and subsequent storage of user data in the individual block may be prohibited; the bad block may be unlinked from a corresponding good block of the second plane; and the corresponding good block of the second plane may be configured for individual operation to store selected data. Subsequent to configuring the first number of metablocks, it may be determined that an individual block of the first number of metablocks that is located in the second plane has become bad; and the individual block may be designated as a bad block and subsequent storage of selected data in the individual block may be prohibited; the bad block may be unlinked from a corresponding good block of the first plane; the good block of the first plane may be linked with one of the third number of good blocks in the second plane; and the corresponding good block of the first plane and the good block of the second plane may be reconfigured for parallel operation as a metablock. Subsequent to configuring the third number of good blocks in the second plane for individual operation, it may be determined that an individual block of the third number of blocks has become bad; and the individual block may be designated as a bad block and may be prohibited from subsequent storage of selected data.

An example of a multi-plane nonvolatile memory system includes a first plane that includes a first number of good blocks; a second plane that includes a second number of good blocks that is greater than the first number; a first number of metablocks, an individual metablock formed from one good block of the first plane linked with one corresponding good block from the second plane; and a third number of individually operated blocks in the second plane that are not linked with any blocks of the first plane, the third number equal to the second number minus the first number.

The first number of metablocks may store host writes of more than a threshold amount of data and the third number of individually operated blocks may be dedicated to storage of memory system management data and/or host writes of less than the threshold amount of data. The third number of individually operated blocks may be dedicated to storage of memory system management data including one or more of: boot code, file system data, logical-to-physical address mapping data, and bad block location data. At least an additional plane may contain an additional number of good blocks that is greater than the first number, the additional plane containing additional individually operated blocks. Configurable read/write circuits may have at least two modes of accessing stored including: (a) a parallel access mode that accesses the first and second planes in parallel, and (b) an individual access mode that accesses an individual block of either the first plane or the second plane at a time. Wear-leveling circuits may maintain write-erase cycle counts and apply wear leveling schemes including: (a) a first wear leveling scheme for metablocks and (b) a second wear leveling scheme for individually operated blocks. The first plane and the second plane may be monolithically formed in two or more physical levels of arrays of memory cells having an active area disposed above a silicon substrate. Circuitry associated with operation of the first plane and the second plane may be disposed above or within the silicon substrate.

Various aspects, advantages, features and embodiments are included in the following description of examples, which description should be taken in conjunction with the accompanying drawings.

DETAILED DESCRIPTION

Memory System

Figure 1:
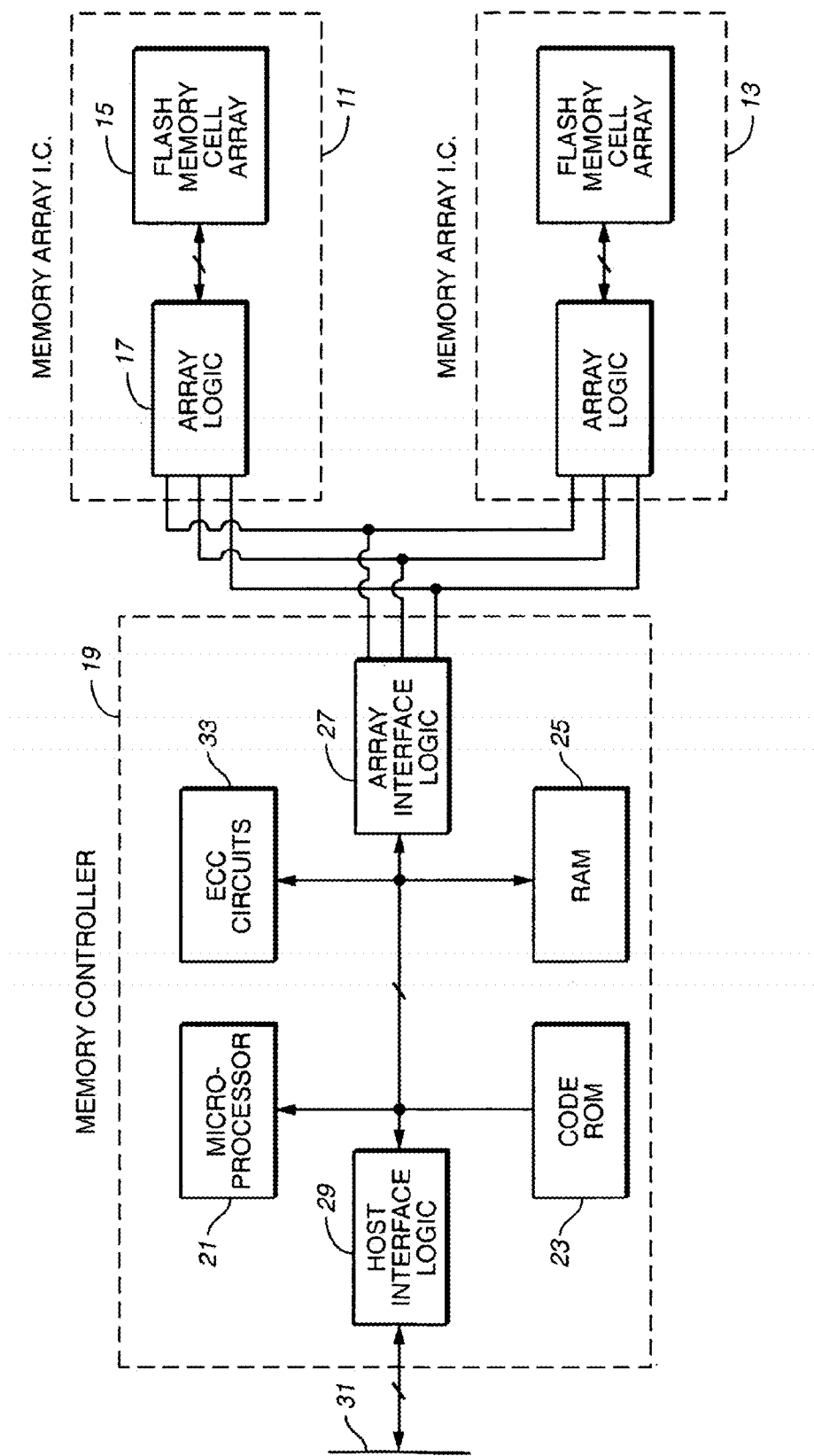
FIG. 1 illustrates schematically the main hardware components of a memory system.

Semiconductor memory devices include volatile memory devices, such as dynamic random access memory ("DRAM") or static random access memory ("SRAM") devices, non-volatile memory devices, such as resistive random access memory ("ReRAM"), electrically erasable programmable read only memory ("EEPROM"), flash memory (which can also be considered a subset of EEPROM), ferroelectric random access memory ("FRAM"), and magnetoresistive random access memory ("MRAM"), and other semiconductor elements capable of storing information. Each type of memory device may have different configurations. For example, flash memory devices may be configured in a NAND or a NOR configuration.

The memory devices can be formed from passive and/or active elements, in any combinations. By way of non-limiting example, passive semiconductor memory elements include ReRAM device elements, which in some embodiments include a resistivity switching storage element, such as an anti-fuse, phase change material, etc., and optionally a steering element, such as a diode, etc. Further by way of non-limiting example, active semiconductor memory elements include EEPROM and flash memory device elements, which in some embodiments include elements containing a charge storage region, such as a floating gate, conductive nanoparticles, or a charge storage dielectric material.

Multiple memory elements may be configured so that they are connected in series or so that each element is individually accessible. By way of non-limiting example, flash memory devices in a NAND configuration (NAND memory) typically contain memory elements connected in series. A NAND memory array may be configured so that the array is composed of multiple strings of memory in which a string is composed of multiple memory elements sharing a single bit line and accessed as a group. Alternatively, memory elements may be configured so that each element is individually accessible, e.g., a NOR memory array. NAND and NOR memory configurations are exemplary, and memory elements may be otherwise configured.

The semiconductor memory elements located within and/or over a substrate may be arranged in two or three dimensions, such as a two dimensional memory structure or a three dimensional memory structure.

In a two dimensional memory structure, the semiconductor memory elements are arranged in a single plane or a single memory device level. Typically, in a two dimensional memory structure, memory elements are arranged in a plane (e.g., in an x-z direction plane) which extends substantially parallel to a major surface of a substrate that supports the memory elements. The substrate may be a wafer over or in which the layer of the memory elements are formed or it may be a carrier substrate which is attached to the memory elements after they are formed. As a non-limiting example, the substrate may include a semiconductor such as silicon.

The memory elements may be arranged in the single memory device level in an ordered array, such as in a plurality of rows and/or columns. However, the memory elements may be arrayed in non-regular or non-orthogonal configurations. The memory elements may each have two or more electrodes or contact lines, such as bit lines and word lines.

A three dimensional memory array is arranged so that memory elements occupy multiple planes or multiple memory device levels, thereby forming a structure in three dimensions (i.e., in the x, y and z directions, where the y direction is substantially perpendicular and the x and z directions are substantially parallel to the major surface of the substrate).

As a non-limiting example, a three dimensional memory structure may be vertically arranged as a stack of multiple two dimensional memory device levels. As another non-limiting example, a three dimensional memory array may be arranged as multiple vertical columns (e.g., columns extending substantially perpendicular to the major surface of the substrate, i.e., in the y direction) with each column having multiple memory elements in each column. The columns may be arranged in a two dimensional configuration, e.g., in an x-z plane, resulting in a three dimensional arrangement of memory elements with elements on multiple vertically stacked memory planes. Other configurations of memory elements in three dimensions can also constitute a three dimensional memory array.

By way of non-limiting example, in a three dimensional NAND memory array, the memory elements may be coupled together to form a NAND string within a single horizontal (e.g., x-z) memory device levels. Alternatively, the memory elements may be coupled together to form a vertical NAND string that traverses across multiple horizontal memory device levels. Other three dimensional configurations can be envisioned wherein some NAND strings contain memory elements in a single memory level while other strings contain memory elements which span through multiple memory levels. Three dimensional memory arrays may also be designed in a NOR configuration and in a ReRAM configuration.

Typically, in a monolithic three dimensional memory array, one or more memory device levels are formed above a single substrate. Optionally, the monolithic three dimensional memory array may also have one or more memory layers at least partially within the single substrate. As a non-limiting example, the substrate may include a semiconductor such as silicon. In a monolithic three dimensional array, the layers constituting each memory device level of the array are typically formed on the layers of the underlying memory device levels of the array. However, layers of adjacent memory device levels of a monolithic three dimensional memory array may be shared or have intervening layers between memory device levels.

Then again, two dimensional arrays may be formed separately and then packaged together to form a non-monolithic memory device having multiple layers of memory. For example, non-monolithic stacked memories can be constructed by forming memory levels on separate substrates and then stacking the memory levels atop each other. The substrates may be thinned or removed from the memory device levels before stacking, but as the memory device levels are initially formed over separate substrates, the resulting memory arrays are not monolithic three dimensional memory arrays. Further, multiple two dimensional memory arrays or three dimensional memory arrays (monolithic or non-monolithic) may be formed on separate chips and then packaged together to form a stacked-chip memory device.

Associated circuitry is typically required for operation of the memory elements and for communication with the memory elements. As non-limiting examples, memory devices may have circuitry used for controlling and driving memory elements to accomplish functions such as programming and reading. This associated circuitry may be on the same substrate as the memory elements and/or on a separate substrate. For example, a controller for memory read-write operations may be located on a separate controller chip and/or on the same substrate as the memory elements.

Various memories may be used other than the two dimensional and three dimensional exemplary structures described above.

Referring initially to FIG. 1, a flash memory includes a memory cell array and a controller. In the example shown, two integrated circuit devices (chips) 11 and 13 include an array 15 of memory cells (which may be 3D or planar) and various logic circuits 17. The logic circuits 17 interface with a controller 19 on a separate chip through data, command and status circuits, and also provide addressing, data transfer and sensing, and other support to the array 13. A number of memory array chips can be from one to many, depending upon the storage capacity provided. A memory cell array may be located on a single chip or may be comprised of memory cells on multiple chips. The controller and part or the entire array can alternatively be combined onto a single integrated circuit chip but this is currently not an economical alternative.

An example of a controller 19 includes a microprocessor 21, a read-only-memory (ROM) 23 primarily to store firmware and a buffer memory (RAM) 25 that may be used for the temporary storage of user data either being written to or read from the memory chips 11 and 13. Circuits 27 interface with the memory array chip(s) and circuits 29 interface with a host though connections 31. The integrity of data is in this example determined by calculating an ECC with circuits 33 dedicated to calculating the code. As user data is being transferred from the host to the flash memory array for storage, the circuit calculates an ECC from the data and the code is stored in the memory. When that user data are later read from the memory, they are again passed through the circuit 33, which calculates the ECC by the same algorithm and compares that code with the one calculated and stored with the data. If they compare, the integrity of the data is confirmed. If they differ, depending upon the specific ECC algorithm utilized, those bits in error, up to a number supported by the algorithm, can be identified and corrected.

The memory of FIG. 1 may be implemented as a small enclosed card containing the controller and all its memory array circuit devices in a form that is removably connectable with a host. That is, connections 31 allow a card to be disconnected and moved to another host, or replaced by connecting another card to the host. Alternatively, the memory array devices may be enclosed in a separate card that is electrically and mechanically connectable with a card containing the controller and connections 31. As a further alternative, the memory of FIG. 1 may be embedded within a host, wherein the connections 31 and 31' are permanently made. In this case, the memory is usually contained within an enclosure of the host along with other components.

Figure 2:
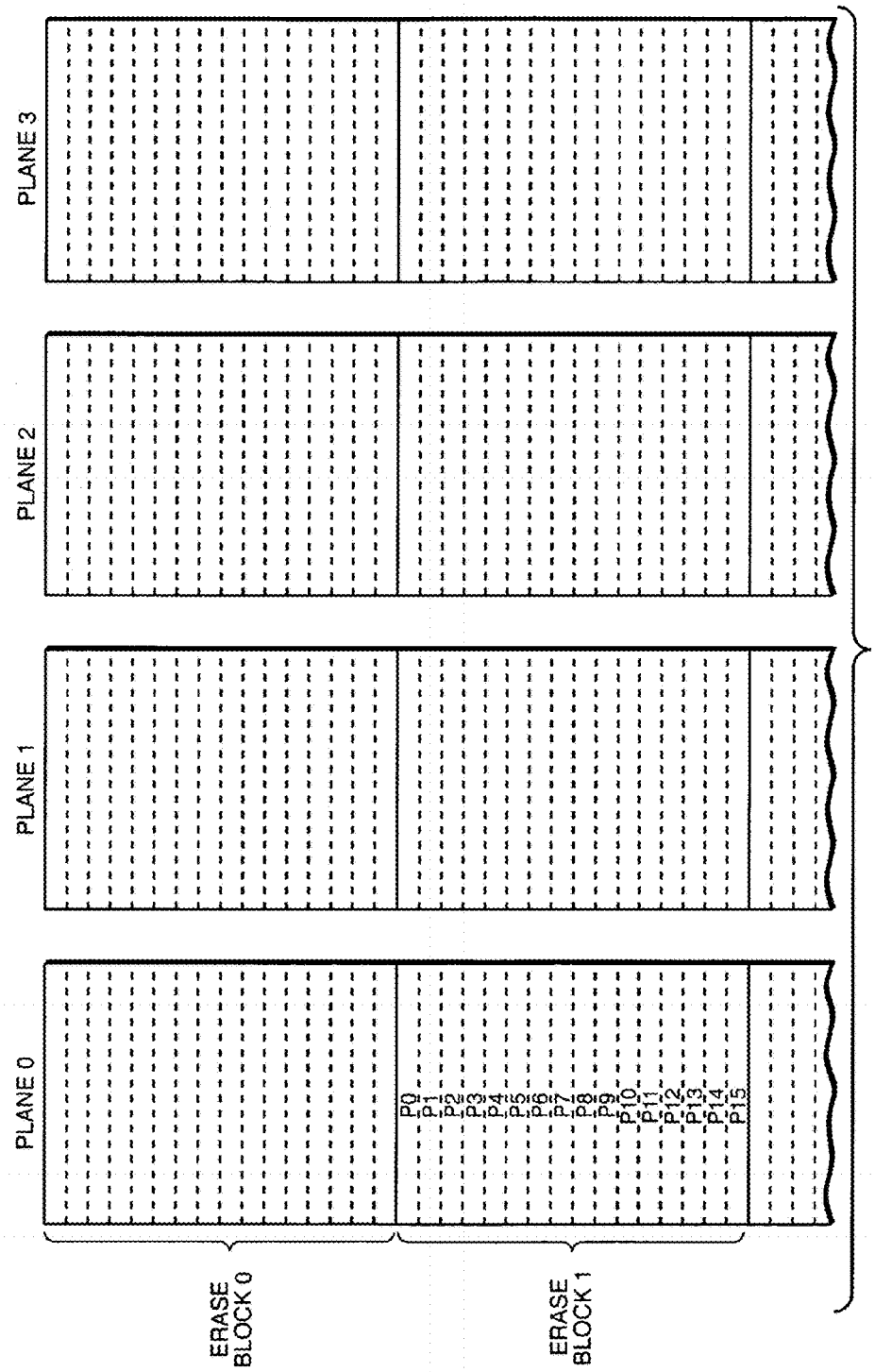
FIG. 2 illustrates a multi-plane memory array.

A portion of flash memory cell array 15 is shown in FIG. 2. Here, the memory cell array is physically divided into two or more planes, four planes 0-3 being illustrated. Each plane is a sub-array of memory cells that has its own data registers, sense amplifiers, addressing decoders and the like in order to be able to operate largely independently of the other planes. All the planes may be provided on a single integrated circuit device or on multiple devices, an example being to form each plane from one or more distinct integrated circuit devices. Each erase block in the example system of FIG. 2 contains 16 pages P0-P15, each page having a capacity of one, two or more host data sectors and some overhead data.

Figure 3:
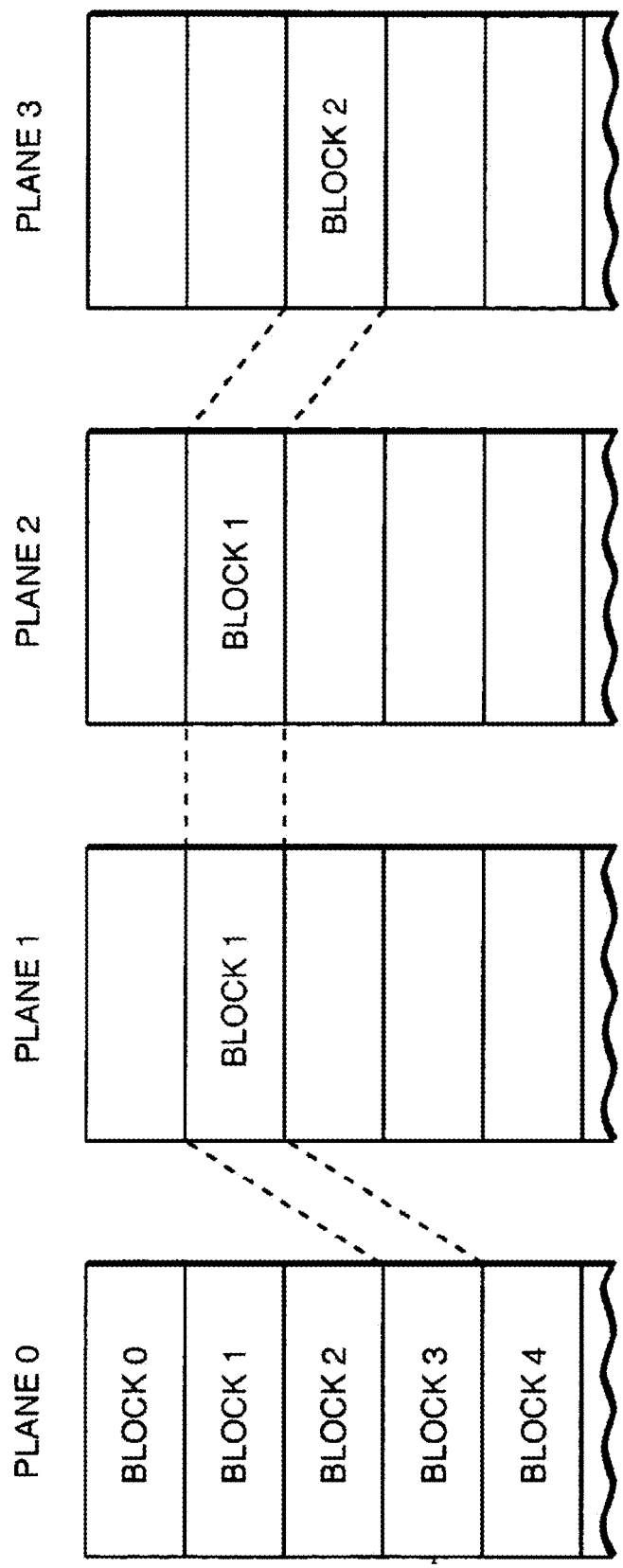
FIG. 3 illustrates formation of a metablock.

Another memory arrangement is illustrated in FIG. 3. Each plane contains a large number of erase blocks. In order to increase the degree of parallelism of operation, erase blocks within different planes are logically linked to form metablocks. One such metablock is illustrated in FIG. 3 by dashed lines showing logically linked blocks in different planes. Each metablock is logically addressable and the memory controller assigns and keeps track of the erase blocks that form the individual metablocks. The host system provides data in the form of a stream of sectors. This stream of sectors is divided into logical blocks. Here, a logical block is a logical unit of data that contains the same number of sectors of data as are contained in a metablock of the memory array. The memory controller maintains a record of the location where each logical block is stored. All blocks of the metablock are erased together, and pages from each block are generally programmed and read simultaneously.

In some examples, erase blocks are linked together to form metablocks in a static linking arrangement. For example, block 0 of each plane could be linked to form a metablock; block 1 of each plane could be similarly linked to form another metablock, etc. In other examples, erase blocks are linked together in dynamic manner so that different erase blocks may be linked at different times.

Figure 4:
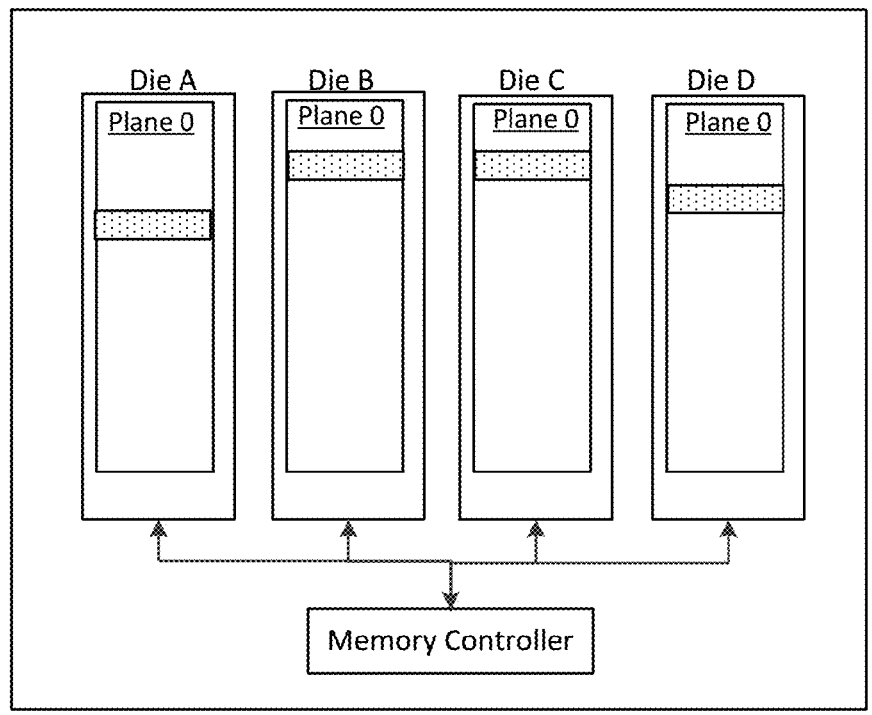
FIG. 4 illustrates a four-die memory array with one plane per die.

FIG. 4 shows the case of four planes, each in a different memory die (Die A-Die D). The shaded areas indicate particular erase blocks in each plane that are to be programmed in parallel as a metablock. This allows efficient operation of the memory for mass data storage. For example, when a large amount of data is sent by a host for storage in the memory the data may be stored with a high degree of parallelism. Data may be transferred from the memory controller over the data bus sequentially to on-chip registers (data latches) in each plane. The data may then be written from the registers to the memory array in parallel. Linked blocks forming a metablock may be read in parallel also and data may then be transferred over the shared data bus in series. Linked blocks forming a metablock may also be erased in parallel.

Figure 5:
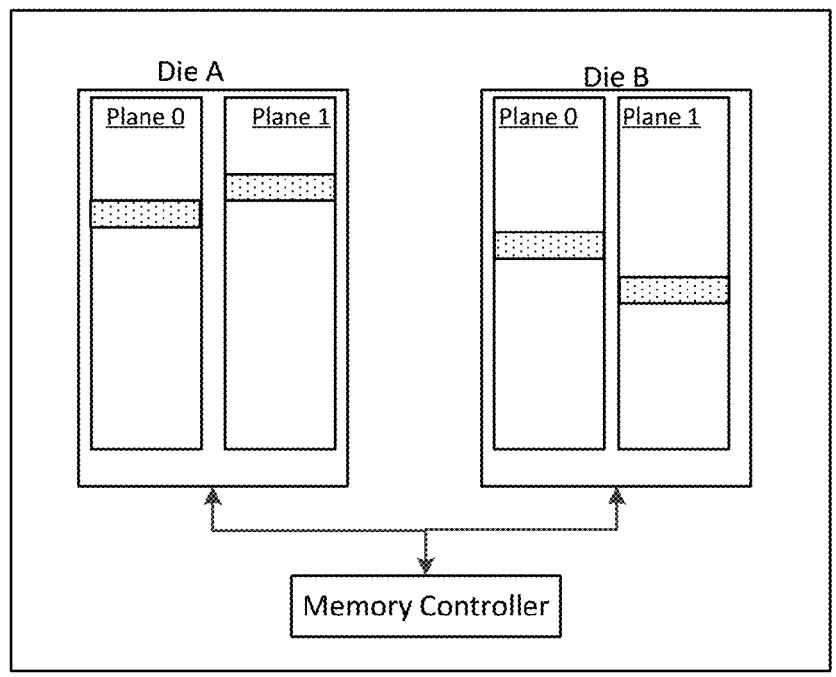
FIG. 5 illustrates a two die memory with two planes in each die.

FIG. 5 shows another example in which two dies (Die A, Die B) are connected to a memory controller and each die has two planes (plane 0, plane 1). The shaded blocks of the four different planes are linked to form a metablock. It will be understood that FIGS. 4 and 5 are simply examples and that many other configurations with different numbers of dies and/or planes are possible. It will also be understood that a memory controller may operate more than one memory bus and each memory bus may have many memory dies and planes. Aspects of the present examples are not limited to any particular number of dies and/or planes.

In many nonvolatile memory systems blocks are subject to some testing to determine if they meet some minimum standard. Blocks that fail to meet this standard are designated as "bad blocks" and are not subsequently used for data storage. Bad blocks may be detected during an initial testing operation, prior to storing any user data, or may be detected later after some period of use. For example, a block may become bad over time and may be detected by failure to read, write, or erase adequately (e.g. within some predetermined period of time). When bad blocks are found, their locations may be recorded so that there are no subsequent attempts to store data in them. A memory controller may maintain a bad block list for this purpose.

Figure 6:
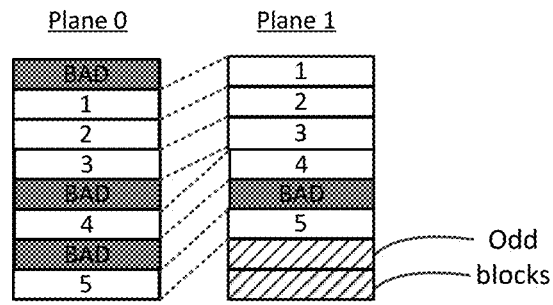
FIG. 6 illustrates a two die memory with two planes with different numbers of bad blocks.

FIG. 6 illustrates a multi-plane memory system with some bad blocks. Plane 0 includes three bad blocks while plane 1 includes just one bad block. Bad blocks are mapped out by recording their locations in a bad block list which prevents subsequent storage of user data in the bad blocks. Good blocks are configured for parallel operation by linking them into metablocks. However, in this example the number of bad blocks per plane is unequal and accordingly the number of good blocks per plane is unequal. When blocks are linked to form metablocks each good block in plane 0 is linked to a good block in plane 1. Because there are more good blocks in plane 1 there are some good blocks in plane 1 that are left over, i.e. some good blocks in plane 1 for which no corresponding good block in plane 0 exists (odd blocks). In this case the number of blocks in plane 1 two greater than the number of good blocks in plane 0 so that two odd blocks remain after linking. Such odd blocks may remain unused because the memory is configured for parallel operation and the odd blocks are not linked and thus are not configured for parallel operation. This may result in low memory capacity. The lost capacity due to odd blocks, in addition to capacity lost due to bad blocks, may be significant. In particular, where bad blocks are concentrated in a particular plane or planes and other planes have fewer bad blocks a significant number of otherwise good blocks may go unused simply because no corresponding good blocks are available for linking for parallel operation.

Figure 7:
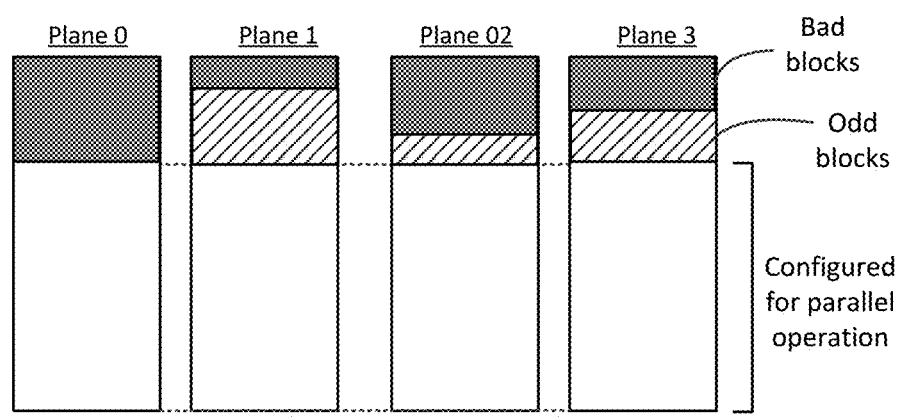
FIG. 7 illustrates space utilization across four planes with different numbers of bad blocks in each plane.

FIG. 7 shows a four plane arrangement in which capacity is lost in planes 1-3 because there are insufficient good blocks in plane 0 to allow all good blocks in planes 1-3 to be linked. FIG. 7 illustrates lost capacity due to bad blocks (shaded) and odd blocks (hashed) in logical space (bad blocks are not physically located contiguously but capacity lost due to bad blocks may be considered as a single portion of logical space, similarly odd blocks may be at various physical locations and are not necessarily contiguous). The amount of space that is configured for parallel operation depends on the number of good blocks in the worst plane (i.e. in the plane with the fewest good blocks) which is plane 0 in this example. Remaining good blocks in planes 1-3 have no corresponding good block to link with in plane 0 and so remain unlinked. It can be seen that capacity loss due to odd blocks generally increases with the number of planes operated in parallel and varies with the distribution of bad blocks (more capacity lost when bad blocks are concentrated in a plane).

Some aspects are directed to operating multi-plane memory systems so that high access speeds associated with parallel block operation are maintained while the capacity loss due to odd blocks is reduced or eliminated. Odd blocks may be configured for individual operation (not in parallel with a block of another plane). This allows such odd blocks to be used even where no corresponding block is available in another plane. In order to maintain high access speeds, long host writes are directed to linked blocks (metablocks) so that such data is written with a high degree of parallelism. This data may subsequently be read with a similarly high degree of parallelism and the linked blocks may be erased in parallel when the data they contain becomes obsolete. Short host writes and writes of memory system management data are directed to individual blocks (unlinked blocks) and are written with low parallelism (one plane writes). This has little or no impact on overall speed because such short writes do not generally benefit from high parallelism. Individually operated blocks may be operated so that adequate access speed is maintained (e.g. by SLC operation). By reserving individual blocks for appropriate data and operating them in an appropriate way, the additional capacity of the individual blocks may be used with little or no impact on overall memory access speeds.

Individually operated blocks may be used to store memory system management data. Memory system management data may include a variety of different types of data that are maintained by a memory controller in a nonvolatile memory. Rather than being received from a host through a host interface, such data is generated by the memory controller and is used in its operation. Memory management data may include boot code, file system data, logical-to-physical address mapping data, bad block location data, allocation data, and other types of data that the memory controller may maintain. Different memory systems may differ in how memory system management data is configured and stored. Memory management data may all be maintained in the same manner, or different types of memory management data may be maintained in different manners. For example, boot code and bad block location data may be infrequently updated and may be stored in a dedicated block or blocks so that write disturbs are minimized while file system data may be frequently updated and may be stored in different blocks.

Figure 8:
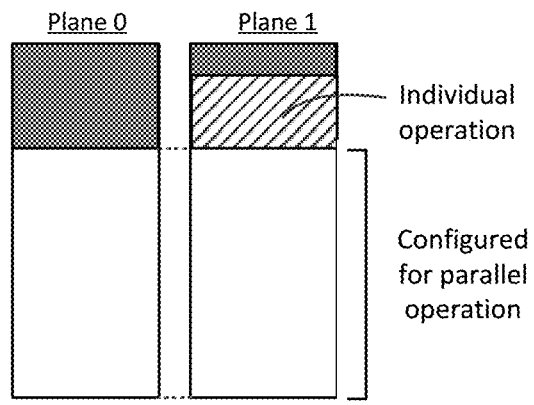
FIG. 8 illustrates an example of reconfiguration of odd blocks for individual operation.

FIG. 8 illustrates a two plane memory array in which all good blocks of the worst plane (plane with fewest good blocks, plane 0 in this example) are operated in parallel for storage of long host writes. Remaining good blocks of plane 1 that are unlinked are configured for individual operation for storage of short host writes and/or memory system management data.

Figure 9:
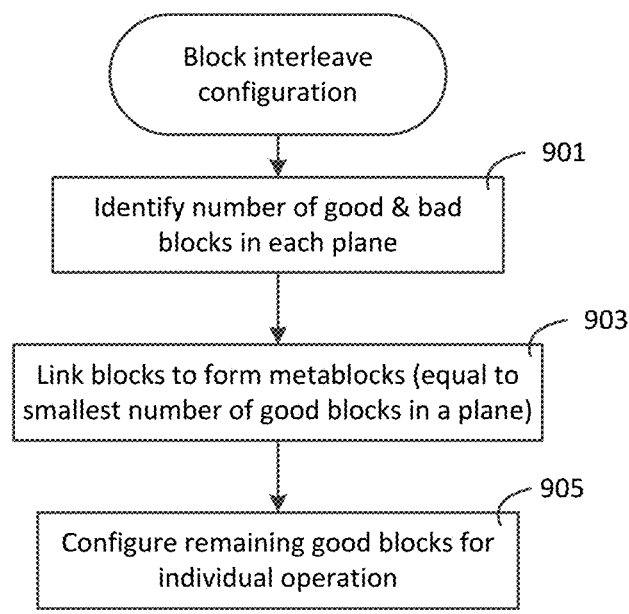
FIG. 9 illustrates an example of configuration of a multi-plane memory.

FIG. 9 illustrates how blocks may be configured for different interleaving (e.g. multi-plane interleaving and single-plane operation). The number of good and bad blocks in each plane is determined 901. Then blocks of different planes are linked until good blocks of at least one plane (plane with smallest number of good blocks) are exhausted 903. Subsequently, any remaining (unlinked) good blocks in other planes are configured for individual operation 905. A memory controller may maintain a record indicating the locations of such individual blocks and may refer to the record when storing data.

In some cases, blocks that are operated individually may be operated in a similar manner to blocks that are linked and operated in parallel. In other cases, blocks that are operated individually may be operated differently. For example, where individually operated blocks store short writes and memory management data, these blocks may be operated as Single Level Cell (SLC) blocks even where linked blocks are operated as Multi Level Cell (MLC) blocks. In this way bulk data of long host writes is stored in a high density arrangement while short writes that may be more frequently accessed are written in a faster, lower density arrangement. This allows faster access to such data which may be particularly advantageous when the data is frequently updated and/or frequently read.

Different wear leveling schemes may be applied to linked blocks and individually operated blocks. Data access patterns may be very different causing these blocks to wear very differently. In general, linked blocks used for storage of long host writes may have low wear (low write-erase cycle count) because such data may be stored for relatively long periods of time. In contrast, individually operated blocks that are used for short host writes and/or memory management data may be frequently written and erased especially if there are few such blocks so that wear leveling becomes more important and may be more frequently performed. Operating such blocks in SLC mode may help to reduce wear. In some cases, it may be desirable to remap blocks for linked and individual operation after some period of time or some threshold number of write erase cycles. In this way, blocks that were initially linked may be unlinked and subsequently operated individually while blocks that were initially individually operated may subsequently be linked for parallel operation. Thus, while the pool of individually operated blocks may contain the same number of blocks over time, the physical blocks in the pool may be rotated over time in order to promote wear leveling.

Figure 10:
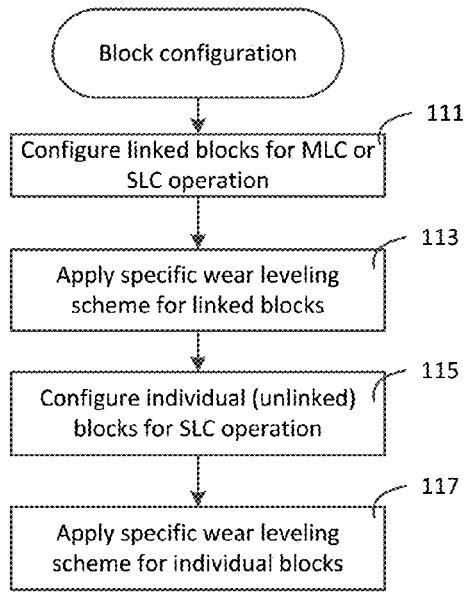
FIG. 10 illustrates an example of configuration of linked and unlinked blocks.

FIG. 10 illustrates configuration of blocks of a multi-plane memory array. Linked blocks are configured for MLC or SLC operation 111 (e.g. storing one, two, three, or more bits per memory cell). In some cases, linked SLC blocks are used to provide high speed writing of data received from a host and the data is later relocated to linked MLC blocks. A specific wear leveling scheme is applied to such linked MLC and SLC blocks 113. Individually operated blocks are configured for SLC operation 115 in this example. A specific wear leveling scheme is applied to such individually operated blocks 117. In other examples, some or all individually operated blocks may be operated as MLC blocks.

It will be understood that individually operated blocks may be operated in a variety of ways to achieve desired results. In some cases individually operated blocks use particular schemes that are not used in linked blocks to ensure that important data is protected from loss. For example, some memory management data may be considered to be important because if it was lost then the operation of the memory could be compromised. Accordingly, more than one copy of some memory management data may be stored in individually operated blocks (while only one copy of host data may be stored in linked blocks). For example two copies of boot code may be maintained. Different ECC schemes may be applied to data in linked blocks and individually operated blocks. In many cases, MLC data has a higher Bit Error Rate (BER) than SLC data in similar blocks so that MLC data may require greater ECC redundancy. In other cases, higher ECC redundancy is applied to memory management data to provide a high degree of protection from loss. Other redundancy schemes, such as applying Exclusive OR (XOR) schemes, may be used to ensure that important data can be recovered. In some three dimensional memory arrays, certain physical locations in three dimensional blocks may produce higher Bit Error Rates (BERs). For example, memory cells in lower physical levels (closer to the substrate) or along edges of blocks may have higher BERs. Storage of certain memory management data in such physical locations may be prohibited even where storage of host data in such locations in linked blocks is permitted.

Figure 11:
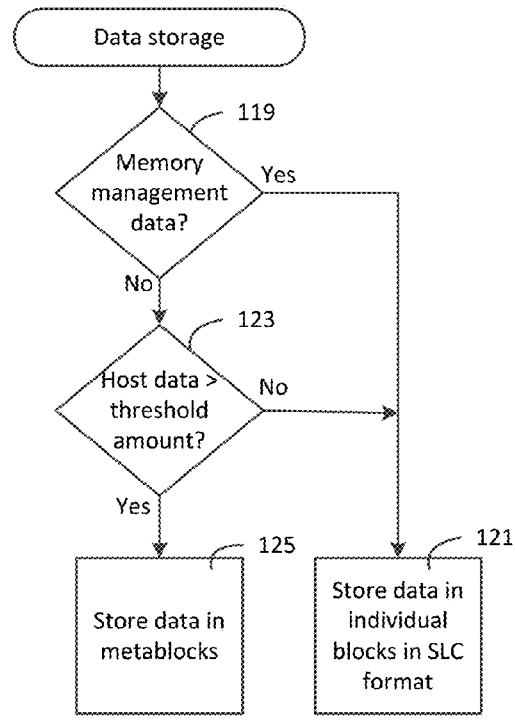
FIG. 11 illustrates an example of how data may be stored in a multi-plane memory.

FIG. 11 illustrates an example of how data may be stored in a multi-plane memory that uses different interleave schemes. A determination may be made as to whether the data is memory management data 119. If it is memory management data then it is stored in individual blocks that are operated in SLC format 121. If the data is not memory management data then a determination is made as to whether the data is host data greater than a threshold amount 123. The threshold may be based on the page size (i.e. on the amount of data that may be written in one block in a given write operation) or other memory parameter. If the host data exceeds the threshold amount then the data is stored in one or more metablocks 125 (linked blocks across multiple planes). Metablocks may use SLC or MLC format. For example, the data may initially be stored in an SLC metablock and later relocated to an MLC metablock (in a "folding" operation) so that high write speed and high long-term storage density are achieved. If the host data is not greater than the threshold amount then the host data is stored in individually operated blocks in SLC format 121.

In some cases, bad blocks develop over time so that a block that is initially good may subsequently become bad (a "grown" bad block). This may affect operation of linked blocks. For example, where one block in a metablock becomes bad then the metablock can no longer be operated. The remaining good block or blocks from the metablock may then be unlinked and reconfigured so that they remain in use.

Figure 12:
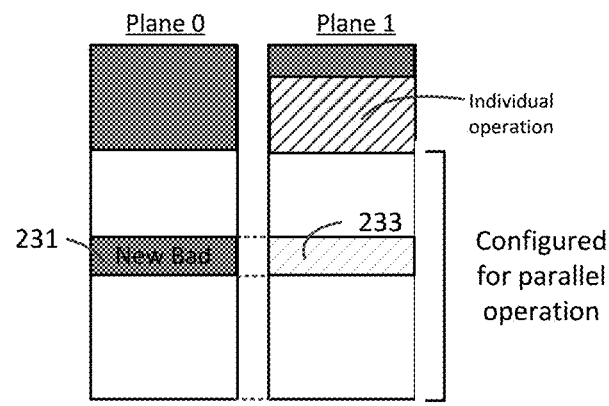
FIG. 12 illustrates an example of a new bad block in the plane with the largest number of bad blocks.

FIG. 12 shows an example in which a new bad block 231 develops in the plane with the fewest good blocks, plane 0. This further reduces the number of good blocks in plane 0 and thus reduces the number of metablocks that can be formed. Accordingly, good block 233 in plane 1 (previously linked to new bad block 231) is unlinked from new bad block 231 and is configured for individual operation.

Figure 13:
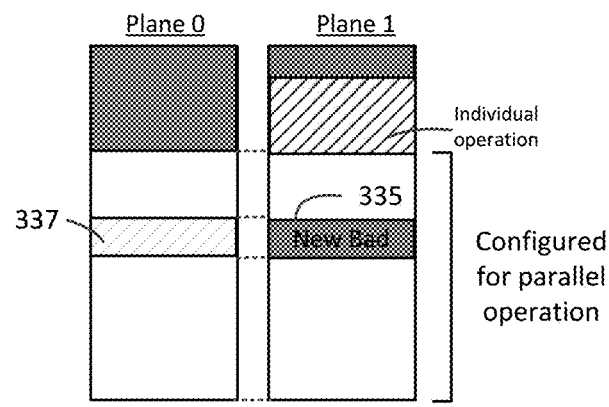
FIG. 13 illustrates an example of a new bad block in a plane that is not the plane with the largest number of bad blocks.

FIG. 13 shows an example in which a new bad block 335 develops in a plane 1 which is not the plane with the fewest good blocks. In this case, new bad block 335 in plane 1 may be unlinked and the corresponding good block 337 in plane 0 may be linked to a different block of plane 1. Because the number of good blocks in plane 0 remains as before, the number of metablocks may be kept the same by relinking good block 337 with a block in plane 1 that was previously individually operated. While this may reduce the number of individually operated blocks in plane 1 it maintains the number of metablocks.

Another possibility is that a block that is configured for individual operation becomes bad. In this case, no change in block linking is required. The block simply becomes a bad block and the number of individual blocks is reduced accordingly.

In some cases, the number of individually operated blocks resulting from unequal numbers of bad blocks in different planes is not sufficient to store short host writes and memory management data. In such cases, an appropriate modification of the above schemes may be applied. For example some short host writes, or some memory management data may be stored in parallel in MLC blocks, or some blocks may be unlinked and operated independently even where there are corresponding blocks across all planes to allow block linking.

CONCLUSION

The foregoing detailed description has been presented for purposes of illustration and description. It is not intended to be exhaustive or to limit the claims to the precise form disclosed. Many modifications and variations are possible in light of the above teaching.

It is claimed:

1. A method of operating a multi-plane flash memory array comprising:
   identifying bad blocks in a first plane of the multi-plane flash memory array and designating a first number of good blocks of the first plane for storage of user data;
   identifying bad blocks in a second plane of the multi-plane flash memory array and designating a second number of good blocks of the second plane for storage of user data, the second number being greater than the first number;
   linking the first number of good blocks of the first plane with good blocks of the second plane to form the first number of metablocks, each of the first number of metablocks configured for parallel operation across the first and second planes;
   configuring the first number of metablocks for Multi Level Cell (MLC) or Single Level Cell (SLC) operation;
   identifying a third number of good blocks in the second plane that are not linked, the third number being equal to the second number minus the first number;
   configuring the third number of good blocks in the second plane for individual operation to store selected data;
   configuring the identified third number of good blocks only for SLC operation;
   subsequently performing a plurality of write-erase cycles on the third number of good blocks;
   subsequently determining whether the multi-plane flash memory array is in condition for remapping; and
   in response to determining that the multi-plane flash memory array is in condition for remapping, swapping one or more physical blocks from the third number of good blocks with one or more physical blocks of the first number of metablocks.

2. The method of claim 1 wherein the selected data comprises memory system management data that is stored by a memory controller.

3. The method of claim 2 wherein the memory system management data includes one or more of: boot code, file system data, logical-to-physical address mapping data, and bad block location data.

4. The method of claim 1 wherein the selected data comprises short host writes of less than a threshold amount of data.

5. The method of claim 1 wherein the first number of metablocks are configured for to store data with a first level of redundancy and the third number of good blocks are configured to store data with a second level of redundancy.

6. The method of claim 1 further comprising:
   subsequent to configuring the first number of metablocks, determining that an individual block of the first number of blocks of the first plane has become bad;
   designating the individual block as a bad block and prohibiting subsequent storage of user data in the individual block;
   unlinking the bad block from a corresponding good block of the second plane; and
   configuring the corresponding good block of the second plane for individual operation to store selected data.

7. The method of claim 1 further comprising:
   subsequent to configuring the first number of metablocks, determining that an individual block of the first number of metablocks that is located in the second plane has become bad; and
   designating the individual block as a bad block and prohibiting subsequent storage of selected data in the individual block;
   unlinking the bad block from a corresponding good block of the first plane;
   linking the good block of the first plane with one of the third number of good blocks in the second plane; and
   reconfiguring the corresponding good block of the first plane and the good block of the second plane for parallel operation as a metablock.

8. The method of claim 1 further comprising:
subsequent to configuring the third number of good blocks in the second plane for individual operation, determining that an individual block of the third number of blocks has become bad; and
designating the individual block as a bad block and prohibiting subsequent storage of selected data.

9. A multi-plane nonvolatile memory system comprising:
a first plane that includes a first number of good blocks;
a second plane that includes a second number of good blocks that is greater than the first number;
a first number of metablocks, an individual metablock formed from one good block of the first plane linked with one corresponding good block from the second plane;
a third number of individually operated blocks in the second plane that are not linked with any blocks of the first plane, the third number equal to the second number minus the first number, the identified third number of individually operated blocks only for Single Level Cell (SLC) operation; and
wear-leveling circuits that maintain write-erase cycle counts and apply wear leveling schemes including: a scheme that remaps physical blocks between the first number of metablocks and the third number of individually operated blocks.

10. The multi-plane nonvolatile memory system of claim 9 wherein the first number of metablocks store host writes of more than a threshold amount of data and the third number of individually operated blocks are dedicated to storage of memory system management data and/or host writes of less than the threshold amount of data.

11. The multi-plane nonvolatile memory system of claim 10 wherein the third number of individually operated blocks are dedicated to storage of memory system management data including one or more of: boot code, file system data, logical-to-physical address mapping data, and bad block location data.

12. The multi-plane nonvolatile memory system of claim 9 further comprising at least an additional plane that contains an additional number of good blocks that is greater than the first number, the additional plane containing additional individually operated blocks.

13. The multi-plane nonvolatile memory system of claim 9 further comprising:
configurable read/write circuits that have at least two modes of accessing stored including: (a) a parallel access mode that accesses the first and second planes in parallel, and (b) an individual access mode that accesses an individual block of either the first plane or the second plane at a time.

14. The multi-plane nonvolatile memory system of claim 9 further comprising redundancy circuits configured to provide a first level of redundancy to data stored in the metablocks and configured to provide a second level of redundancy to data stored in the individually operated blocks.

15. The multi-plane nonvolatile memory system of claim 9 wherein the first plane and the second plane are monolithically formed in two or more physical levels of arrays of memory cells having an active area disposed above a silicon substrate.

16. The multi-plane nonvolatile memory system of claim 15 further comprising circuitry associated with operation of the first plane and the second plane, the circuitry disposed above or within the silicon substrate.

17. The multi-plane nonvolatile memory system of claim 9 wherein the first plane and the second plane are formed in a common die.

18. The multi-plane nonvolatile memory system of claim 9 wherein the first plane is formed in a first die and the second plane is formed in a second die.

19. The multi-plane nonvolatile memory system of claim 9 wherein the first number of metablocks are configured for Multi Level Cell (MLC) operation and the third number of good blocks are configured only for SLC operation.

20. A method of operating a multi-plane flash memory array comprising:
identifying bad blocks in a first plane of the multi-plane flash memory array and designating a first number of good blocks of the first plane for storage of user data;
identifying bad blocks in a second plane of the multi-plane flash memory array and designating a second number of good blocks of the second plane for storage of user data, the second number being greater than the first number;
linking the first number of good blocks of the first plane with good blocks of the second plane to form the first number of metablocks, each of the first number of metablocks configured for parallel operation across the first and second planes;
configuring the first number of metablocks for Multi Level Cell (MLC) or Single Level Cell (SLC) operation;
configuring the first number of metablocks for storage with a first level of redundancy;
applying a first wear-leveling scheme to the first number of metablocks;
identifying a third number of good blocks in the second plane that are not linked, the third number being equal to the second number minus the first number;
configuring the third number of good blocks in the second plane for individual operation to store selected data;
configuring the identified third number of good blocks only for SLC operation;
configuring the third number of good blocks for storage of data with a second level of redundancy;
applying a second wear-leveling scheme to the second number of metablocks; and
subsequently performing a plurality of write-erase cycles on the third number of good blocks;
subsequently determining whether the multi-plane flash memory array is in condition for remapping; and
in response to determining that the multi-plane flash memory array is in condition for remapping, swapping one or more physical blocks from the third number of good blocks with one or more physical blocks of the first number of metablocks.

* * * * *